United States Patent [19]

Ichiki et al.

[11] 4,123,325
[45] Oct. 31, 1978

[54] CONTAINERS FOR HOUSING NUCLEAR REACTORS

[75] Inventors: Tadaharu Ichiki, Tokyo; Eiji Shiho, Machida; Koji Kitagawa, Yokohama, all of Japan

[73] Assignee: Tokyo Shibaura Denki Kabushiki Kaisha, Japan

[21] Appl. No.: 654,175

[22] Filed: Feb. 2, 1976

[30] Foreign Application Priority Data

Feb. 5, 1975 [JP] Japan .................................. 50-15942

[51] Int. Cl.² .............................................. G21C 9/00
[52] U.S. Cl. ........................................ 176/38; 176/87
[58] Field of Search ....................... 176/37, 38, 87, 30, 176/31, 32

[56] References Cited

U.S. PATENT DOCUMENTS

| | | | |
|---|---|---|---|
| 3,446,171 | 5/1969 | Panoff et al. | 176/38 X |
| 3,713,968 | 1/1973 | Kennedy et al. | 176/37 |
| 3,937,651 | 1/1976 | Schabert et al. | 176/38 |

FOREIGN PATENT DOCUMENTS

| | | | |
|---|---|---|---|
| 2,513,822 | 3/1975 | Fed. Rep. of Germany | 176/38 |
| 1,201,322 | 12/1959 | France | 176/87 |
| 1,210,341 | 3/1960 | France | 176/87 |

*Primary Examiner*—Samuel W. Engle
*Assistant Examiner*—Ralph Palo
*Attorney, Agent, or Firm*—Stevens, Davis, Miller & Mosher

[57] ABSTRACT

In a pressure tight steel container for housing a nuclear reactor of the type wherein the container is surrounded by a biological shield wall, the container is supported by a relatively flexible structure, and a protective wall is provided along the inner surface of the container for receiving the jet stream and the percussive forces of bodies flying about at high speeds in the container as a result of the existence of emergency conditions. The outer surface of the container is spaced from the biological shield wall by an annular space sufficient to permit ready access to the outer surface of the container.

6 Claims, 2 Drawing Figures

CONTAINERS FOR HOUSING NUCLEAR REACTORS

BACKGROUND OF THE INVENTION

This invention relates to a container for housing a nuclear reactor, and more particularly to an improved container capable of withstanding an earthquake and protecting the container against jet streams of steam and water and the percussive forces of bodies moving at high rates of speed under emergency conditions.

As diagrammatically shown in FIG. 1, a prior art container 1 for housing a nuclear reactor is contained in a biological shield wall 2 integral with the foundation mat 9 for supporting the building for the nuclear reactor. The biological shield wall and the foundation mat 9 are usually made of reinforced concrete. A pedestal 3 is mounted on the bottom of the container 1 for supporting the pressure vessel 4 of the reactor.

Various pipes including a main steam pipe 5 are connected to the pressure vessel 4, and means 6 for preventing the whipping of the main steam pipe 5 and other pipes, not shown, for example, pipes for circulating the water in the reactor, is supported by a thermal shield wall 7 which is mounted on the pedestal 3 so as to surround the pressure vessel 4. Since the means 6 for preventing the whipping of the main steam pipe 5 is supported by the pedestal 3 through means of the thermal shield wall 7, in a cantilever fashion, not only the means 6 but also the thermal shield wall 7 and the pedestal 3 are required to be highly rigid with the result that they become massive and decrease the free space in the container 1. In addition to the various pipes described above, various valves, electric motors, and instrumental devices are also contained in the container 1.

Should such pipes break for some reason, high pressure water and steam eject are ejected through the broken pipe like a jet stream and impinge upon the inner wall of the container 1. Furthermore, in an emergency, some of the various elements described above will be thrust against the container with considerable force and at high rates of speed.

In prior art container for housing a nuclear reactor, it has been necessary to fabricate the container 1 with steel plates having sufficient mechanical strength and thickness to withstand the large forces caused by the aforenoted jet streams or entrained component elements. But according to the present standards and or codes, it is required to perform post-assembly weld heat treatments for container 1 when the same is fabricated with plates having a thickness greater than a predetermined limit.

According to the present practice, in order to avoid the post-assembly weld heat treatments the container 1 has been encased within the biological shield 2 with a small gap 8 defined therebetween. Consequently when the container is subjected to large forces, the integrity of the container, fabricated with plates having a thickness within the standard and or permissible by the code, can be maintained.

Considering the resistance of the structure against earthquakes, the vibration of the foundation mat is transmitted directly to the pressure vessel 4 as well as to a plurality of fuel rods, not shown, contained therein and extending through the rigid container 1 and the pedestal 3. Accordingly, the fuel rods, having a natural vibration frequency relatively close to that of the reactor building, resonate so as to vibrate greatly. Consequently it has been difficult to prevent vibration of and damage the fuel rods.

During the fabrication of the structure, since the gap 8 between the reactor container 1 and the biological shield 2 is small, as above described, it has been impossible to approach the entire outer surface of the container 1. Accordingly, it has been impossible to perform a leak test once the container 1 has been installed. In other words, unless the leak test has been completed, the biological shield 2 can not be fabricated, thus prolonging the overall construction period of the reactor plant.

Moreover, as the means 6 for preventing the whipping of the pipe is supported on the pedestal 3 through means of the thermal shield wall 7, it has been necessary to construct the pedestal 3 so as to have sufficient strength.

SUMMARY OF THE INVENTION

Accordingly, it is an object of this invention to provide an improved container for housing a nuclear reactor capable of withstanding earthquakes and protecting the container against jet streams of the steam and water in the reactor and against the percussive force of bodies flying about at high rates of speed under emergency conditions.

Another object of this invention is to provide an improved container for housing a nuclear reactor capable of providing a wide space between the reactor container and the biological shield wall which will permit ready access to the container whereby it is possible to simultaneously fabricate the container and the biological shield and to carry out the leak test of the container after completion of the reactor plant.

Still another object of this invention is to provide an improved reactor container capable of simplifying the design and construction of the pedestal for supporting the nuclear reactor and the thermal shield wall surrounding the reactor.

According to this invention, there is provided a pressure tight steel container for containing a nuclear reactor of the type wherein the container comprises a bottom wall and a substantially cylindrical side wall which is surrounded by a biological shield wall, and wherein further there is provided a relatively flexible supporting structure for supporting the container and a protective wall provided along substantially the entire inner surface of the container for receiving the jet streams and the percussive forces of high speed moving bodies which are created in the container in the case of an emergency, the outer surface of the container being spaced from the biological shield wall by an annular space sufficient to permit ready access to the outer surface of the container.

As usual, the reactor is provided with a main steam pipe and water circulating pipes, the reactor is supported by a pedestal mounted on the supporting structure, and a thermal shield is mounted on the pedestal so as to surround the reactor. According to this invention, means for preventing the whipping of the pipe or pipes is provided between the protective wall and the thermal shield wall thus simplifying the construction of the thermal shield wall and the pedestal.

DESCRIPTION OF THE PREFERRED EMBODIMENT

Figure 1:
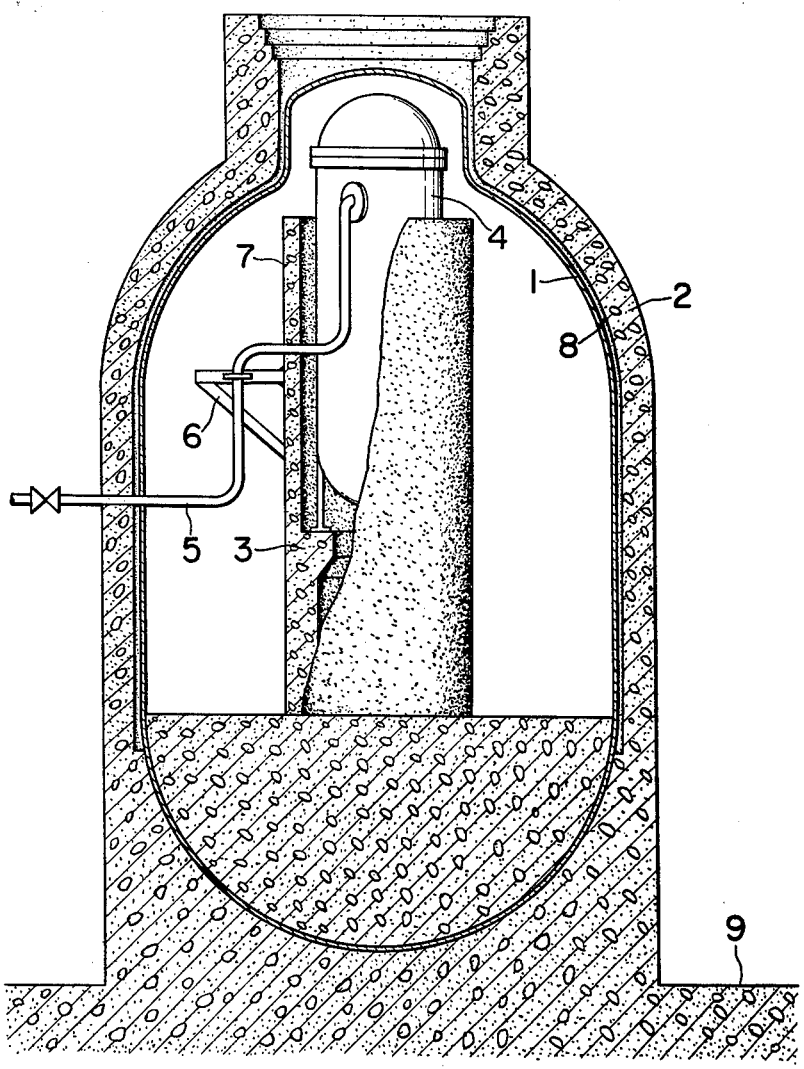
FIG. 1 is a diagrammatic longitudinal sectional view showing the construction of a prior art container for housing a nuclear reactor.
Figure 2:
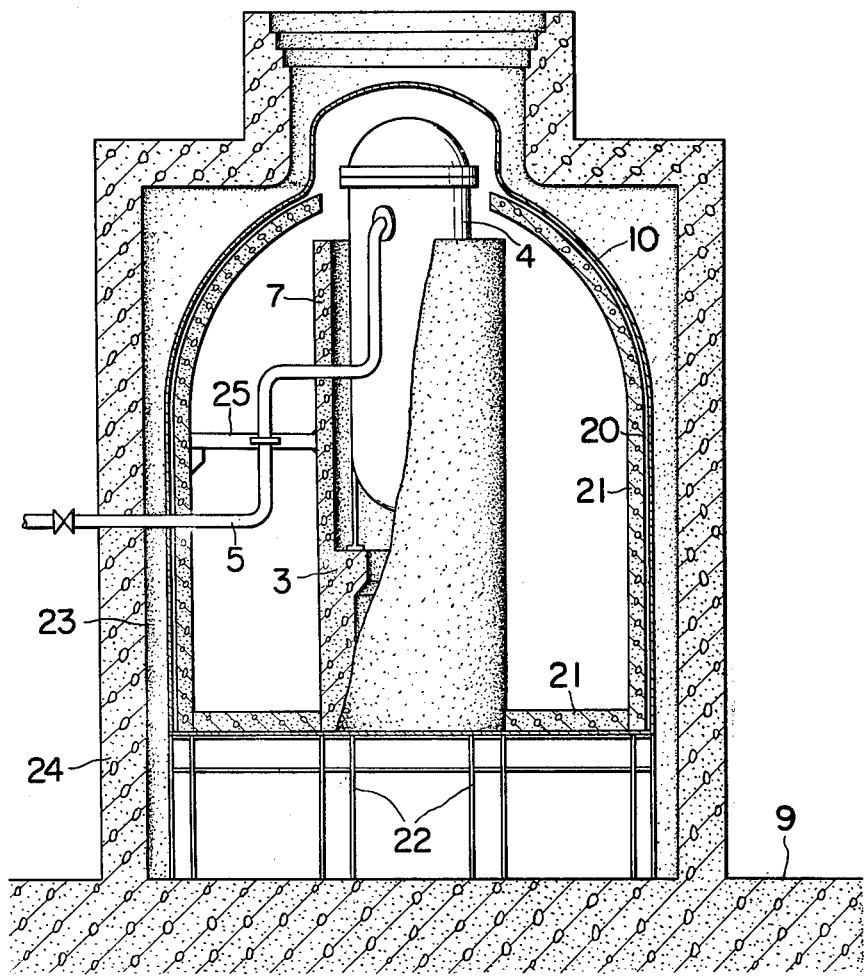
FIG. 2 is a view similar to that of FIG. 1 showing one embodiment of this invention.

Referring now to FIG. 2, in which component elements corresponding to those shown in FIG. 1 are designated by the same reference numerals, there is provided a protective wall 21, made of reinforced or other structural material, along the inner surface of a reactor container 10 with a small gap 20 defined therebetween as illustrated, the wall 21 is not provided within the upper portion of the container. The container 10 has a flat horizontal bottom which is mounted on a steel beam structure 22 for supporting the weight of the reactor container 10. The steel beam structure 22 is constructed so as to have a natural vibration frequency such that it will attenuate or dampen the vibrations of the earthquakes transmitted to the container 10 from the foundation mat 9 of the building of the reactor plant. Furthermore, according to this invention, between the container 10 and a biological shield wall 24, there is provided an annular space 23 having a volume sufficient to permit free access to the outer surface of the container 10 and to prevent any interference between the container and the biological shield wall 24 during earthquake periods. Means 25 for preventing the whipping of the main steam pipe 25, for example, is connected between the thermal shield wall 7 and the concrete protective wall 21. As is well known in the art, the main steam pipe 5 is connected, for example, to a steam turbine, not shown, which is normally disposed exteriorly of the reactor, and is likewise connected to a steam generator, also not shown, which is normally disposed interiorly of the reactor.

In operation, should the main steam pipe 5 break, the jet stream of the water and steam emitted from the broken pipe impinges upon the protective wall 21 which covers substantially the entire inner surface of the container 10 thus protecting the same against the jet stream. Furthermore, when the pipe 5 breaks, forces are applied to the protective wall 21, as well as to the thermal shield wall 7 and the pedestal 3 through means of the whipping preventing means 25. Moreover, in the case of an emergency even when the component parts in the container, such as the pumps, motors, valves, and instrumental devices, might be blown about at high speeds, they would collide with the protective wall 21 and would never reach the inner wall of the reactor container 10.

Upon the occurrence of an earthquake, the building of the nuclear plant, the reactor container, and the like, will be subjected to transverse forces. Due to these forces, the frame structure 22 at the bottom of the container 10 will be deformed and such deformation will be transmitted to the container 10. However, as has been pointed out before, since the frame structure 22 is constructed such that it will have a low natural vibration frequency the reactor container 10 will not resonate with the reactor building thereby greatly alleviating the earthquake forces acting upon the container 10. Under these conditions, the reactor container 10 undergoes substantial deformation, however, since there is provided a sufficiently large annular space 23 between the container 10 and the biological shield wall 24, these two members can vibrate independently without any mutual interference.

As above described, the improved reactor container embodying the invention has the following advantages:

1. The jet stream caused by the breakage of the main steam pipe or other pipes, and the large percussive forces caused by entrained component elements at the time of an emergency are all received by the protective wall disposed interiorly of the reactor container so that the container is well protected against these forces. For this reason it is possible to fabricate the wall of the container with a relatively small thickness.

2. As above described, since all of the destructive forces at the time of the energency are received by the protective wall, it is possible to make the gap 23 defined between the reactor container and the biological shield wall 24 large enough so as to permit a man to approach the exterior of the container. This permits a leak test of the container to be performed after the building of the reactor plant has been completed. For this reason, it is also possible to simultaneously fabricate the reactor container and the reactor building, thus shortening the construction period.

3. Since the reactor container is supported by a relatively flexible structure it is possible to prevent the resonance of the fuel rods with the reactor building thereby improving the resistance of the fuel rods against earthquake damage. The use of the relatively flexible supporting structure causes a large deformation or displacement of the reactor container to occur as a result of an earthquare thus requiring a large space to be provided between the container and the biological shield. However, this problem can be readily solved as above described. Rather, according to this invention, as it is possible to render large the space between the reactor container and the biological shield wall, it is possible to fabricate these members at the same time and to perform a leak test of the container after the structural completion of the reactor container and the biological shield.

4. Since the means for preventing whipping of the pipes within the container is supported by means of the protective wall and the thermal shield wall, the forces impressed upon this means are shared between the protective wall and the thermal shield wall so that it is possible to simplify the design and construction of the thermal sheild wall and the pedestal.

Although the invention has been shown and described in terms of a preferred embodiment thereof it should be understood that many changes and modifications will occur to one skilled in the art without departing from the scope of the invention. For example, it is not necessary to fabricate the protective wall with concrete, and it is clear that any material that can withstand the jet stream and the percussive forces caused by members moving at high rates of speed can also be used. Moreover, the relatively flexible pliable frame structure for supporting the reactor container may be made of any material other than steel beams, such as steel pipes, springs, or the like.

We claim:

1. In a pressure tight steel container for housing a rigidly supported pressure vessel containing a nuclear reactor of the type wherein said container comprises a bottom wall and a substantially cylindrical side wall which is surrounded by a biological shield wall spaced from said container side wall, the improvement which comprises:

a relatively flexible metal framework supporting structure for supporting the bottom wall of said container, and a protective wall provided along substantially the entire inner surface of said container and supported by the bottom wall thereof for receiving the jet stream and the percussive forces of high speed moving bodies which are created in said container in the case of an emergency.

2. The container according to claim 1 wherein said protective wall is made of concrete.

3. The container according to claim 1 wherein said supporting structure comprises a framework of steel beams.

4. The container according to claim 1 wherein said reactor is provided with a pipe for passing fluid and supported by a pedestal mounted on said supporting structure, a thermal shield wall is mounted on said pedestal to surround said reactor, and means for preventing the whipping of said pipe is provided between said protective wall and said thermal shield wall.

5. The container according to claim 1 wherein said supporting structure has a natural vibration frequency such that it prevents resonance of the foundation of the reactor building and the fuel rods of the nuclear reactor.

6. The container as set forth in claim 1, wherein:
said protective wall is spaced from said inner surface of said container by means of a small gap defined therebetween.

* * * * *